United States Patent
Pfeuffer et al.

[15] 3,704,012
[45] Nov. 28, 1972

[54] DEVICE FOR POSITIONING A CUTTING TORCH IN A FLAME CUTTING MACHINE

[72] Inventors: Alfred Pfeuffer, Neu-Isenburg; Gustav Kalkhof, Langen/Hessen; Helmut Weber, Steinbach/Ts., all of Germany

[73] Assignee: Messer Griesheim GmbH, Frankfurt/Main, Germany

[22] Filed: Sept. 14, 1970

[21] Appl. No.: 72,067

[30] Foreign Application Priority Data

Sept. 18, 1969 Germany..........P 19 47 283.4

[52] U.S. Cl. .............................................. 266/23 K
[51] Int. Cl. .............................................. B23k 7/10
[58] Field of Search ...266/23 K, 23 M, 23 R, 23 HH; 148/9; 164/263; 58/132

[56] References Cited

UNITED STATES PATENTS

| 3,403,896 | 10/1968 | Mortellito et al. | 266/23 K |
| 3,539,168 | 11/1970 | Pfeuffer | 266/23 R |

FOREIGN PATENTS OR APPLICATIONS

| 1,044,147 | 6/1953 | France | 266/23 HH |

*Primary Examiner*—Robert D. Baldwin
*Attorney*—Ernest F. Marmorek

[57] ABSTRACT

The positioning device comprises an angularly displaceable cutting torch means, stop bars abutting from opposite sides against the workpiece to be separated, and limiting the movement of the torch means. The torch means actuates in its limit positions a torch drive and flame controlling device.

7 Claims, 3 Drawing Figures

PATENTED NOV 28 1972

INVENTORS.
ALFRED PFEUFFER
GUSTAV KALKHOF and
BY HELMUT WEBER

*[signature]*

THEIR ATTORNEY

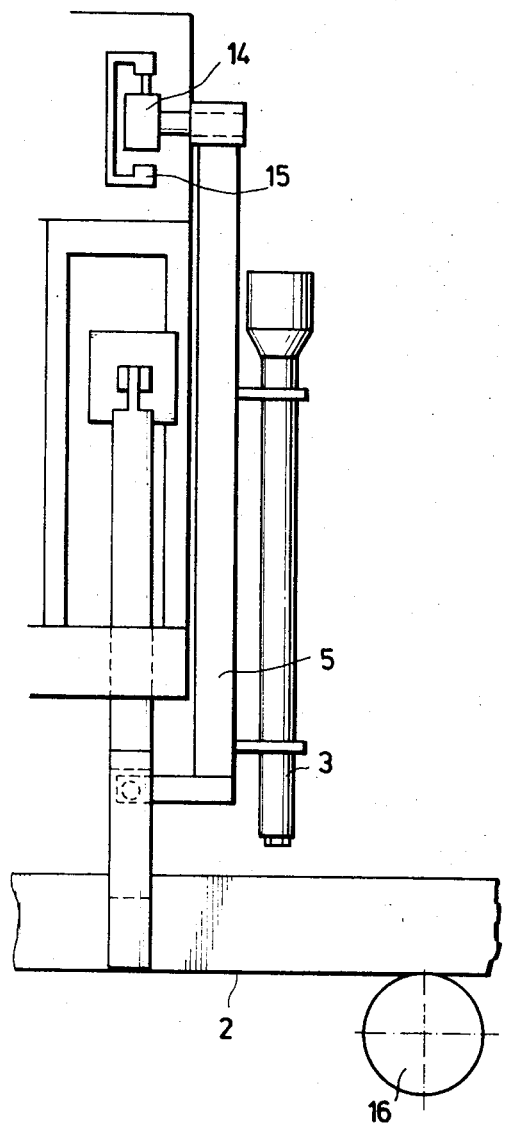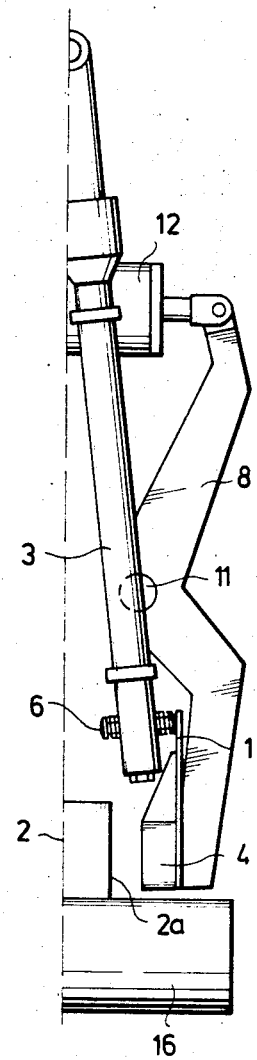

DEVICE FOR POSITIONING A CUTTING TORCH IN A FLAME CUTTING MACHINE

BACKGROUND OF THE INVENTION

This invention relates generally to a flame cutting apparatus for separating workpieces, particularly continuous castings, billets, slabs, ingots and the like. In particular, the invention relates to a position controlling device for movable cutting torch means in the above mentioned apparatus, which determines the beginning and the end of the cutting operation.

SUMMARY OF THE INVENTION

The object of this invention is to provide a controlling device of the aforesaid kind which works reliably and is simple in operation and design.

To this end, stop bars are proposed according to the invention, which lie on the one hand against the surface at which the cut is started and on the other hand against the surface at which the cut is ended and which project into the path of movement of the torch or of a component connected to the torch and limit the cutting path of the latter. In addition, in this arrangement control elements are provided which are operated by way of the torch in dependence on the position of the latter. These stop bars thus enable an exact movement range of the torch to be determined automatically in dependence on the length of cut required in each particular case, without complicated additional arrangements having to be made for this purpose.

The invention may also advantageously be applied to flame cutting machines for bars which are provided with a device for clamping the cutting device to the bar. In flame cutting machines for bars of this kind the longitudinal advance of the flame cutting machine is synchronized in a simple manner with the speed of the bar during the cutting operation by clamping the flame cutting machines to the cast bar which is guided on a roller table. On completion of the cutting this clamp connection is released and the flame cutting machine travels back over a distance corresponding to the length of a cast bar portion to be cut, thereupon being connected again to the cast bar by means of the clamp device on the commencement of a new cutting operation. In a flame cutting machine of this kind it is proposed according to the invention that the clamp jaws of the clamp device should be in the form of limit stops. It is also possible to equip the clamp jaws which are known in themselves with additional stop elements which project into the range of movement of the torch. In the case of this construction the clamp jaws normally used need merely be lengthened upwardly by means of the additional stop strips so as to extend into the range of the torch movement, in order to achieve automatic determination of the length of the cut.

In a further development of the invention it is proposed that there should be provided on the torch clamping means a stop disk which cooperates with the stop bars on the clamp jaws. In this arrangement this stop disk may preferably be made adjustable in order to enable any adjustment of the displacement of the torch position at the commencement and completion of the cutting operation in accordance with conditions in each particular case.

In order to insure reliable switching-on and switching-off of the torch prior to and after the completion of the cut, it is further proposed according to the invention that the torch drive be provided with a slipping clutch which is equipped with means known in themselves for controlling the clipping of the clutch. In a particularly advantageous development of this construction the means are so disposed that they switch off the torch drive when the stop cam on the torch clamping means strikes against the stop bar on the clamp jaws and the slipping of the clutch is thereby brought about.

The essential advantage of the construction according to the invention consists in that considerable non-productive time can be saved, since the middle plane of the torch can be brought close to the starting cut surface at the commencement of the cut in order to enable the flame cutting to commence immediately. This is also true in respect to the termination of the cut after reliable cutting through, since the subsequent operations can then be initiated immediately. In both cases the side surfaces of the bar are used as reference planes.

BRIEF DESCRIPTION OF SEVERAL VIEWS OF THE DRAWING

The invention is explained in greater detail with reference to a drawing which illustrates a random example of embodiment and in which:

FIG. 2 is a schematical side view of the device of FIG. 1; and

FIG. 3 is a sectional front view of the device of FIG. 1 with the clamp jaws open.

DETAILED DESCRIPTION

Figure 1:
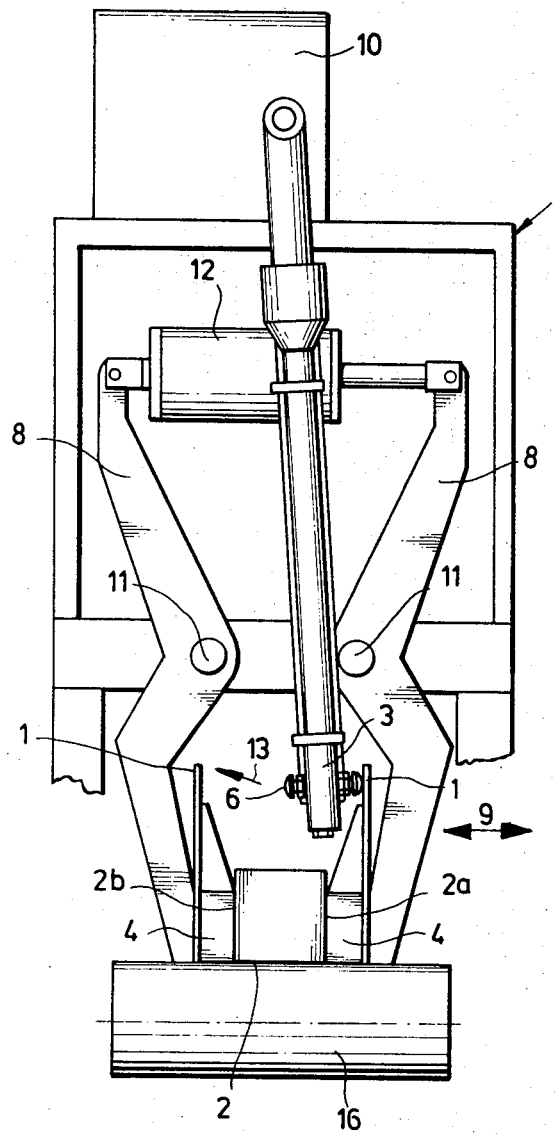
FIG. 1 is a schematical front view of the torch position controlling device according to this invention.

The bar flame cutting machine designated generally by 7 in FIG. 1 consists essentially of the torch 3 which is fastened to an angularly displaceable torch clamping means 5, the clamp jaws 4 which by means of levers 8 can be swiveled in the direction of the arrow 9, and the burner drive 10 which for the sake of simplicity is not shown in full detail. The levers 8 which are rockably mounted in pivot points 11 are operated by means of a pressure cylinder 12. A workpiece 2 to be cut off, such as a continuous casting, is guided on supporting rollers of which only one roller 16 is illustrated in the drawing.

In the position as illustrated in FIG. 1, the two clamp jaws 4 are forced against the workpiece 2. One clamp jaw 4 abuts against the starting cut surface 2a and the other jaw 4 abuts against the terminal cut surface 2b. The limit stop bars 1, which extend into the range of movement of the torch 3, are disposed on the clamp jaws 4. Stop disks 6, one of which is in the position as shown in FIG. 1, abut the right hand stop bar 1, and are disposed on the torch clamping means 5 opposite the stop bars. Instead of two stop disks 6, it is also possible to use an arrangement in which a single stop disk 6 is provided on a side of the torch. The stop disk or disks 6 can for example be in the form of a threaded belt and be adjustable axially in threaded bores in their corresponding supports on the torch clamping means 5.

When the torch 3 during its movement indicated by the arrow 13 reaches the left hand stop bar 1 after completing the flame cut through the workpiece 2, so that the stop disk 6 is stopped by the stop bar 1, an inner part 14 of a flame control clutch slips in relation to the outer part 15 of the control clutch which is indicated schematically in FIG. 2; the clutch actuates means (not illustrated for the sake of simplicity) which automatically switch off the gas supply for the torch in this end position. FIG. 3 shows the torch in the starting position, in which the clamp jaws 4 are open and the flame control clutch is ready to switch on the gas supply and ignite the cutting flame.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a flame cutting machine for severing continuously moving workpieces, particularly continuous castings, billets, slabs, bars and ingots, a controlling device for controlling the position of a pendulum-type movable cutting torch means at the start and after the completion of the cut comprising, in combination, opposed stop members, one stop member abutting the surface of the workpiece at which the flame cut is started and the other stop member abutting the opposite surface at which the cut ends, said stop members projecting into the path of movement of a lower portion of said torch means and limiting said path in accordance with the desired cutting range, and further comprising additional controlling means operatively coupled to an upper portion of said torch means to control the cutting operation in response to the position of said torch means.

2. In a flame cutting machine according to claim 1, said stop members including clamping means with clamp jaws for clamping the work piece, and stop bars, projecting into the path of movement of said torch means, said clamp jaws being connected to said stop bars.

3. In a flame cutting machine according to claim 2, said torch means supporting stop disks for abutting the stop bars on said clamp jaws.

4. In a flame cutting machine according to claim 3, said stop disks being in the form of adjustable threaded pins.

5. In a flame cutting machine according to claim 1, said movable cutting torch means comprising a torch clamping member and a rocking torch drive operatively connected to said torch clamping member.

6. In a flame cutting machine according to claim 5, said torch drive being provided with a controlling clutch having inner and outer slipping members.

7. In a flame cutting machine according to claim 6, said controlling clutch further comprising switching means to switch off the torch drive when the stop disk of the torch clamping member strikes against the stop bar of the clamp jaw and the clutch member starts slipping.

* * * * *